United States Patent [19]

Zuerner et al.

[11] Patent Number: 5,198,143

[45] Date of Patent: Mar. 30, 1993

[54] COMPOSITION FOR THE TREATMENT OF OVERSPRAY IN PAINT SPRAY BOOTHS CONTAINING SECONDARY ALCOHOL ESTERS AND SURFACTANTS

[75] Inventors: Edwin C. Zuerner, Troy; Robert A. Patzelt; Norman Foster, both of Bloomfield Hills, all of Mich.

[73] Assignee: Nortru, Inc., Detroit, Mich.

[21] Appl. No.: 861,091

[22] Filed: Mar. 31, 1992

Related U.S. Application Data

[63] Continuation-in-part of Ser. No. 790,650, Nov. 8, 1991.

[51] Int. Cl.$^5$ .............................................. C11D 7/50
[52] U.S. Cl. .................................. 252/170; 252/546; 252/547; 252/DIG. 8
[58] Field of Search ................ 252/170, DIG. 8, 546, 252/547

[56] References Cited

U.S. PATENT DOCUMENTS

| | | | |
|---|---|---|---|
| 4,130,674 | 12/1978 | Roberts et al. | 427/331 |
| 4,265,944 | 5/1981 | Garner | 427/353 |
| 4,276,064 | 6/1981 | Gerdes | 55/217 |
| 4,289,505 | 9/1981 | Hardison et al. | 55/59 |
| 4,295,845 | 10/1981 | Sepuvelda et al. | 8/139.1 |
| 4,339,248 | 7/1982 | Garner | 55/89 |
| 4,378,235 | 3/1983 | Cosper et al. | 55/85 |
| 4,396,405 | 8/1983 | Lindenberger et al. | 55/85 |
| 4,444,573 | 4/1984 | Cosper et al. | 55/37 |
| 4,504,395 | 3/1985 | Harpel et al. | 210/712 |
| 4,523,932 | 6/1985 | Cosper et al. | 55/85 |
| 4,554,026 | 11/1985 | Cosper et al. | 134/38 |
| 4,563,199 | 1/1986 | Lindenberger et al. | 55/85 |
| 4,750,919 | 6/1988 | Patzelt et al. | 55/45 |
| 4,769,172 | 9/1988 | Siklosi | 252/170 X |
| 4,780,235 | 10/1988 | Jackson | 252/170 |
| 4,781,916 | 11/1988 | Papaphilippou | 252/DIG. 8 X |
| 4,812,255 | 3/1989 | Suwala | 252/142 |
| 4,814,092 | 3/1989 | Patzelt | 210/708 |
| 4,854,947 | 8/1989 | Patzelt | 55/85 |
| 4,919,691 | 4/1990 | Patzelt et al. | 55/45 |
| 4,927,556 | 5/1990 | Pokorny | 252/173 |
| 4,948,513 | 8/1990 | Mitchell | 210/705 |
| 4,956,115 | 9/1990 | Van De Mark | 252/170 |
| 5,019,138 | 5/1991 | Farrah et al. | 55/89 |
| 5,076,939 | 12/1991 | Hunter et al. | 210/712 |
| 5,084,200 | 1/1992 | Dishart et al. | 252/173 |
| 5,098,450 | 3/1992 | Patzelt et al. | 55/45 |

OTHER PUBLICATIONS

Eastman Chemicals Product Brochure for Texanol, Publication No. M158H, May 1990.
Eastman Chemical Products, Inc., Material Safety Data Sheet "Texanol" Ester-Alcohol, May 19, 1989.
Eastman Chemical Products, Inc., Material Safety Data Sheet "Kodaflex" TXIB Plasticizer, Aug. 3, 1990.

*Primary Examiner*—Patrick P. Garvin
*Attorney, Agent, or Firm*—Basile and Hanlon

[57] ABSTRACT

A composition for treating oversprayed paints that contains an effective amount of an essentially non-volatile carbonyl compound, an effective amount of an ethoxylated alkyl phenol surfactant in water together with a suitable emulsifier. The carbonyl compound is capable of dissolving paint solids while remaining essentially insoluble in and non-reactive with water. The carbonyl compound can be an alcohol ester having the general formulae

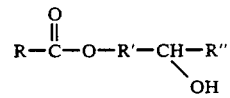

an alcohol ester derivative having the general formula:

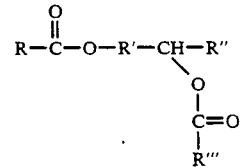

in which R' and R" are a substituted or unsubstituted linear alkyl groups containing 1 to 8 carbon atoms, and R and R''' are linear or branched alkyl groups containing 1 to 10 carbon atoms. The surfactant has an average ethylene oxide-to-nonyl phenol ratio between 4:1 and 8:1.

18 Claims, No Drawings

COMPOSITION FOR THE TREATMENT OF OVERSPRAY IN PAINT SPRAY BOOTHS CONTAINING SECONDARY ALCOHOL ESTERS AND SURFACTANTS

CROSS REFERENCE TO RELATED APPLICATIONS

The present application is a continuation-in-part of Ser. No. 790,650 filed Nov. 8, 1991 which is now pending.

BACKGROUND OF THE INVENTION

Field of the Invention

This invention pertains to compositions suitable for the treatment, removal and/or containment of paint overspray, paint particles, and/or the various non-volatile components of paints, lacquers, enamels and the like. More specifically, this invention relates to compositions containing organic materials which can disperse and solubilize paint constituents in an aqueous medium. This invention also pertains to paint overspray treatment compositions which remain effective over prolonged periods of use on a variety of different paint formulations.

Discussion of the Relevant Art

Large quantities of paint of various kinds, including lacquers, varnishes, enamels, and certain specialty paints such as urethane-based paints, catalyzed two-component paints, base coat/clear coat combination paints, high solids enamels or lacquers, and the like, are used to coat finished products in industries such as automotive manufacture and the like. These paints, lacquers and varnishes are generally solvent-based; however, certain of these paints can be water-based. Some are considered low solids paints (i.e. materials containing about 20 to about 30% solids) while others are considered high solids paints (i.e. those containing above 50% solids).

These coatings or paint materials are generally sprayed onto the piece to be painted or coated in an enclosed area such as a paint spray booth. In this operation, substantial quantities of solvent and oversprayed paint are discharged into the spray booth and the air drawn therein. Paint spray booths provide a means for capturing and containing paint overspray components. The method of choice is to contain the solid overspray material components in a suitable liquid material.

Paint spray booths generally include a chamber, a duct system for passing air through the chamber, and a sump containing circulating liquid located in the bottom of the chamber which can be directionalized in the spray booth chamber to form a curtain of liquid to contact the over-sprayed paint particles and volatile organic solvents and collect portions thereof. The paint spray booth also contains a gas discharge means such as a stack for discharging excess air or gaseous material. The paint spray booth is equipped with baffles or eliminators to reduce particulate carryout to acceptable levels such that most of the solids are retained in the paint spray booth wash water.

The liquid employed in paint spray booth applications is most preferably a hydrophilic material capable of removing solid particulates from the air. The liquid chosen ideally is economical and safe to use. The hydrophilic material of choice typically is comprised of water to which various chemicals are added to provide detackifying properties. Water-based compositions are also desirable for their general ease and safe handling during operation and during spray booth clean-up and maintenance. There are several drawbacks with such water-based systems. These include inconsistent paint kill and detackification, deposits on surfaces, accumulation of paint sludge, increased wet-sludge handling and disposal, and weak performance of water-based systems as paint dispersants or solubilizers.

In contrast to water systems, various organic solvent systems have been proposed for use in paint spray booth applications; i.e. a solvent composition employing a solvent such as n-methyl pyrrolidone as disclosed in U.S. Pat. No. 5,019,138 to Farrah and U.S. Pat. No. 4,941,491 to Goerss. In solvent-based compositions, problems may be encountered during other operations in the paint spray booth employing water, such as routine cleaning and maintenance and fire protection. In addition, the fluid properties of the solvent are likely to cause changes in the performance of the spray booth. Thus, paint spray booths may require modifications to successfully utilize solvent-based systems. It can readily be appreciated that such measures can be cumbersome and expensive.

Heretofore, one improvement has been to employ oil-in-water formulations in which water, oil and various additives are combined to form a suitable emulsion-like material as the hydrophilic liquid of choice. The use of such oil-in-water emulsions is taught in U.S. Pat. Nos. 4,378,235, 4,396,405, 4,523,932, 4,563,199, 4,444,573, 4,544,026, 4,750,919, 4,919,691, all of which are incorporated herein by reference.

Oil-in-water emulsions have been employed to contain greater volumes of paint solids than contained in water alone. However, the amount of paint solids contained in such compositions is generally no greater than 4–6% by volume. There is no evidence to indicate that the oil-in-water emulsions currently in use dissolve or solubilize the paint which they contact. Thus, the capacity of the emulsion is limited to its dispersion capabilities and this is generally a function of the concentration of oil. In order to be effective, oil-in-water emulsions generally contain in excess of 25% by weight oil. In large capacity spray booths this represents a significant material handling activity as well as increased operating expense.

These oil-in-water emulsions are generally weak alkaline emulsions which are easily broken. In order to maintain the material in an emulsified state, it is necessary to employ emulsion stabilizing additives, paying close attention to composition pH, and in many instances, requiring continued mechanical agitation.

Many of the patents previously enumerated provide various approaches for addressing some or all of the shortcomings inherent in oil-in-water emulsions. Of these, U.S. Pat. No. 4,919,691 to Patzelt et al has been one of the more effective. U.S. Pat. No. 4,919,691 to Patzelt et al discloses an oil-in-water emulsion which includes a process oil, a suitable oil-in-water emulsifier; and a non-polar organic solvent chosen from the group consisting of dialkyl esters of dibasic acids (DBE) such as dimethyl adipate, dimethyl glutarate, dimethyl succinate in combination with water. Such additives were included in oil-in-water formulations to increase paint solids capacity in the emulsion and to improve paint solids recovery. However, oil-in-water formulations containing DBE have significant drawbacks. DBE readily hydrolyzes to form water-soluble products which are difficult to remove from water. The products of hydrolysis consume caustic, which thereby lowers the pH of the emulsion, thus jeopardizing its already poor stability. Thus, both caustic and DBE must be replenished to ensure emulsion stability and effectiveness. This fact, and the fact that DBE is not recoverable from the spent material, represent significant drawbacks for any program utilizing oil-in-water formulations containing DBE.

Given the problems encountered with the various hydrophilic liquids currently available, there has been some incentive for manufacturers to switch to alternative technologies for paint spray containment and recovery. However, paint spray booths generally represent major items of capital investment so that wholesale replacement would be prohibitively expensive. Thus, it is highly desirable to develop a liquid composition which performs better and overcomes some of the drawbacks attributable to the circulating fluid in existing paint spray booth systems.

It would be desirable to provide a composition which has a greater capacity for containing paint either by solubilization, dispersion, or a combination of the two. It would also be desirable to provide a stable aqueous composition in which contained paint is maintained rather than being permitted to settle out freely.

It is also desirable that the aqueous composition be made up of chemically stable components which retain their effectiveness in composition for a protracted period and can be readily separated and recovered from the composition when required. It is also desirable that all components in the composition be economical and safe to handle and use. Finally, it is desirable that the composition employed require lower concentrations of active ingredients to achieve effective paint containment than previously obtainable and that the paint sludge thus contained be recoverable in a form which is easy to handle and process.

SUMMARY OF THE INVENTION

The present invention is a composition for treating oversprayed paints which consists essentially of:

a. an effective amount of an essentially non-volatile carbonyl compound selected from the group consisting of alcohol esters, condensation products of alcohol esters and carboxylic acid, and mixtures thereof, the carbonyl compound capable of dissolving paint solids and remaining essentially insoluble and non-reactive in an aqueous media;

b. an effective amount of a surfactant selected from the group consisting of ethoxylated alkyl phenols having an average ratio of moles of ethylene oxide to moles of alkyl phenol between 4:1 and 8:1;

c. an effective amount of an emulsifying agent having an HLB value ranging from about 6 to about 40, with a range from about 10 to about 30 being preferred; and d. water.

The carbonyl compound employed in the composition of the present invention is selected from hydrocarbons having the general formulae:

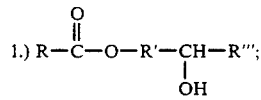

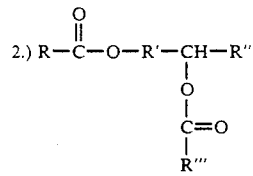

and mixtures thereof; wherein R' and R" is chosen from the group consisting of substituted or unsubstituted linear alkyl groups having from 1 to 8 carbon atoms in the basic chain; and R and R''' are chosen from linear or branched alkyl groups having from 1 to 10 carbon atoms; R and R''' being either identical or different alkyl functionalities.

BRIEF DESCRIPTION OF THE PREFERRED EMBODIMENT

The composition of the present invention can be successfully employed in conventional paint spray booth applications as an effective, more efficient substitute for conventional hydrophilic liquids such as water, organic solvents, or oil-in-water emulsions.

The composition of the present invention consists essentially of:

a. an effective amount of a carbonyl compound selected from the group consisting of alcohol esters, or condensation products of alcohol esters and carboxylic acid, and mixtures thereof capable of dissolving paint solids and remaining essentially insoluble in an aqueous media;

b. an effective amount of a surfactant selected from the group consisting of ethoxylated alkyl phenols, having an average ratio of moles of ethylene oxide to moles of alkyl phenol between 4:1 and 8:1;

c. an emulsifying agent having an HLB value ranging from about 6 to about 40, with a range from about 10 to about 30 being preferred; and d. water.

The carbonyl compound is present in an amount between 5 and 50% by volume, with an amount between 5 and 30% by volume being preferred and an amount about 12 and about 18% by volume being most preferred. The emulsifier may be present in any amount effective to provide suitable emulsion characteristics, generally between about 0.1 and about 20% by volume with an amount between about 0.1% and about 10% by total composition volume being preferred. The surfactant is present in an amount between about 0.1 and about 10.0% by total composition volume, with an amount between about 0.5 and about 2.0 being preferred.

The alcohol ester or derivative thereof employed in the composition of the present invention is a material capable of dissolving paint but which is insoluble in an aqueous media. The term "dissolving" as employed herein is defined as a process which encompasses both as dispersal and passing into solution or solubilization of paint solids. The term "insoluble" is defined as having a solubility index of less than about 2 μg/liter.

The carbonyl compound employed in the present invention is selected from the group consisting of carbonyl compounds having the general formulae:

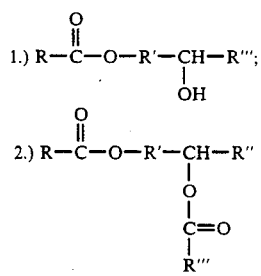

and mixtures thereof; wherein R' and R" are chosen from substituted and unsubstituted linear alkyl groups having between 1 and 8 carbon atoms in the main chain; and R and R''' are chosen from linear or branched alkyl groups having between 1 and 10 carbon atoms wherein R' and R" may be either identical or different alkyl functionalities. In the preferred embodiment R and R" are chosen from the group consisting of unsubstituted ethyl, propyl, butyl, pentyl, and hexyl, functionalities as well as the mono-,di- and tri-alkyl substituted derivatives thereof such as methyl propyl, methyl butyl, ethyl butyl, methyl propyl, dimethyl butyl, dimethyl pentyl, trimethyl pentyl functionalities. R and R''' are chosen from the group consisting of propyl, isoprypyl, butyl, isobutyl, t-butyl functionalities.

The preferred carbonyl compound generally has physical characteristics within the parameters set forth in Table I with a hydrocarbon selected from the group consisting of 2,2,4-trimethyl-1,3-pentanediol monoisobutyrate, 2,2,4-trimethyl-1,3-pentanediol diisobutyrate, and mixtures thereof being preferred.

TABLE I

| PHYSICAL CHARACTERISTICS OF HYDROCARBON | |
|---|---|
| Boiling point | 200° to 300° C. |
| Specific gravity (20° C.) | 0.94 to 0.955 |
| Water Solubility | Insoluble |
| Viscosity (20° C.) | 8 to 14 cP |
| Vapor Pressure | <0.01 mm Hg (at 20° C. and 1 atm) |

In the composition of the present invention, the carbonyl compound is present from about 5 to about 50% by total composition volume. In actual usage, the alcohol ester of the present invention comprises between about 5 and about 30% by volume with amounts between about 12% and about 18% by volume being preferred.

The composition of the present invention also contains a suitable surfactant which is nonionic in nature and is non-reactive in or with water; i.e. does not ionize in water or hydrolyze in aqueous acidic or alkaline solutions. The nonionic surfactants which are advantageously employed in the composition of the present invention are generally the polyoxyalkalene adducts of hydrophobic bases in which the oxygen/carbon atom ratio in the oxyalkalene portion of the molecule is greater than 0.40. Those compositions which are condensed with hydrophobic bases to provide a polyoxyalkalene portion having an oxygen/carbon atom ratio greater than 0.40 include ethylene oxide, butadiene oxide, glycidol and mixtures of these alkylene oxides with one another and with minor amounts of propylene oxide, butylene oxide, amylene oxide, styrene oxide, and other high molecular weight alkylene oxides. In the preferred embodiment, ethylene oxide is condensed with the hydrophobic base in an amount sufficient to impart surface active properties to the molecule being prepared but in an amount low enough for the molecule to exhibit little or no water solubility. The exact amount of ethylene oxide condensed with the hydrophobic base will depend on the hydrophobic base employed and is readily apparent to those of ordinary skill in the art relating to the synthesis of oxyalkalene surfactant condensates.

Typical hydrophobic bases which can be condensed with ethylene oxide in order to prepare nonionic surface active agents include mono alkyl phenols. The alkyl substituent on the aromatic nucleus may be oxtyl, diamyl, m-dodecyl, polymerized propylene such as propylene tetramer and trimer, isooctyl, nonyl, etc. with nonyl phenols being the preferred hydrophobic base.

The polyoxyalkalene adducts of alkyl phenol which can be employed in the present invention have an average mole ratio of ethylene oxide to alkyl phenol between 4:1 and 8:1 E.O. to alkyl pheno respectively. Preferably the surfactant is an nonylphenoxypolyoxyethlene ethanol or mixture thereof having a e.o alkyl phenol ratio of about 4:1. Such ethoxylated nonyl phenols are well known products which, preferably, have the characteristics set forth in Table II. Such materials are commercially available from various sources. Preferred surfactants for use in the present invention are designated in CFTA nomenclature as being selected from the group consisting of nonoxynol-4, nonoxynol-6, nonoxynol-8 and mixtures thereof, with nonoxynol-4 being preferred.

TABLE II

| PHYSICAL CHARACTERISTICS OF SURFACTANT | | | |
|---|---|---|---|
| CFTA Nomenclature | Nonoxynol-4 | Nonoxynol-6 | Nonoxynol-8 |
| Solidification Point, °C. | −29 | −34 | 0 |
| Pour Point, °C. | −20 | −29 | −5 |
| Hydroxyl Number | 140–143 | 115–118 | 94–97 |
| Approximate HLB | 9 | 11 | 12 |
| Moles of EO, average | 4 | 6 | 8 |
| Density, lbs/gal @ 25° C. | 8.5 | 8.7 | 8.6 |

The composition of the present invention also contains an emulsifying agent (i.e. an emulsifier) having an HLB value ranging from about 6 to about 40, with a range from about 10 to about 30 being preferred.

The emulsifier employed should provide effective dispersal of the alcohol ester or alcohol derivative and polypropylene glycol in water. The emulsion thus formed should be amenable to separation through chemical or physical action, or some combination thereof. For example, the emulsion of the present composition may be broken by pH change, or other means if desired, to provide a distinct organic phase and distinct aqueous phases. The materials employed in this invention include water-soluble or dispersible anionic, cationic and nonionic materials. The emulsifiers employed in this invention include water-soluble or dispersible anionic, cationic and nonionic materials.

The preferred organic compound for use as emulsifiers in this invention are saturated and unsaturated carboxylic acids, the alkali metal salts of carboxylic acids, the quaternary amine salts of carboxylic acids, and mixtures thereof. The carboxylic acids employed herein contain from about 12 to about 30, and preferably from about 16 to about 24, carbon atoms. The carboxylic acids assist in the formation of the improved dispersion or emulsion-like state of the composition of the present invention and permit easy breakage of the emulsion into its hydrophilic and hydrophobic component parts when acidified. These component parts are also easy to reform with mild mixing when the pH is readjusted to a range from between about 7.5 to about 12. This mixing may be provided merely by pumping the component parts through a recirculating pump or similar mechanism.

It is also expected that carboxylic acids other than those specifically enumerated herein may be employed and it may also be anticipated that certain stabilizers or combinations of emulsifiers may be used with this invention.

The preferred carboxylic acid for use in this invention is selected from the group consisting of oleic acid, the alkali metal salts of oleic acid, the quaternary amine salts of oleic acid, and mixtures thereof.

The carboxylic acid can be present in any amount effective to produce an emulsion-like composition and interact with the paint solids to be added thereto. It is preferred that the carboxylic acid be present in an amount between about 0.1 to about 20% by weight of said total composition.

The composition of the present invention, preferably contains between about 12% and about 17% by volume of a carbonyl compound selected from the group consisting of 2,2,4-trimethyl-1,3-pentanediol monoisobutyrate, 2,2,4-trimethyl-1,3-pentanediol diisobutyrate, and mixtures thereof; between about 0.5 and about 2.0% by volume of an ethoxylated nonyl phenol surfactant having an average ratio of moles of ethylene oxide to moles of nonyl phenol equal to between 4:1 and 8:1; between about 0.1 and about 5.0% by volume of a suitable emulsifier; with the balance being water. The material is maintained at a pH between about 7.5 and about 12.0 with a pH between about 7.5 and 9.0 being preferred.

In order to further illustrate the composition of the present invention, the following Examples are submitted. These examples are for illustrative purposes only and are not to be construed as limitations of or on the present invention.

FORMULATIONS 1-6

In order to compare the effectiveness of overspray treatment compositions prepared according to the present invention, with conventional formulations, six test emulsions were prepared. Formulation 1 was a conventional oil-in-water emulsion in which the organic phase (oil and oleic acid) constituted 30% by volume of the initial emulsion. Formulations 2 and 4 were modified oil-in-water emulsions containing dialkyl dibasic acids (DBE) as outlined in U.S. Pat. No. 4,919,691 to Patzelt at concentrations of 6% by volume and 12% by volume respectively. The total organic content in Formulation 2 was 30% by volume and in Formulation 4, it was 23% by volume. In Formulation 3, the DBE in Formulation 2 was substituted with diisobutyl esters (DIB). The total initial organic content of this Formulation was 30 vol %.

Formulation 5 was prepared according to the disclosure of the present invention to contain 2,2,4-trimethyl-1,3-pentanediol monoisobutyrate (2,2,4 MONO) and an oleic acid emulsifier in the amount outlined in Table III. Formulation 6 was prepared to contain 2,2,4 MONO, oleic acid, and the surfactant nonylphenoxypolyoxyethylene ethanol (NONOXYNOL-4) in the amount outlined. The total initial organic content of these formulations was 18 and 21% by volume, respectively.

The pH of each Formulation was measured and is recorded in Table II.

EXAMPLES 1-6

In order to ascertain the relative hydrolytic stability of the various formulations, Formulations 1-6 were agitated at high speed for approximately 1 minute and allowed to sit undisturbed for at least seven days. The formulations were agitated 15 minutes prior to sampling. Aqueous, organic, and solid concentrations were determined by acidifying and centrifuging an aliquot of each formulation. The mass balance was calculated and the data collected in Table IV.

As shown in Table IV, formulations containing DBE show a decrease in final organic mass indicating loss of a portion of the organic phase in the aqueous phase due to hydrolysis. No appreciable hydrolysis was detected in the oil/DIB-in water sample or in the formulations prepared according to the present invention.

EXAMPLES 7-36

Actual effectiveness of the various formulations in treating oversprayed paint was determined by admixing a predetermined amount of a respective paint with the given formulation and agitating at high speed for one minute. In all, five commercially available paint formulations were employed with the formulations outlined in Table III: MFGR "A" Clear Coat, MFGR "A" Base Coat, MFGR "A" Prime, MFGR "B" Base Coat, and MFGR "C" Base Coat. These paint formulations are proprietary materials commercially available from various companies. The procedures employed in testing were those outlined previously in Examples 1-6. The data were collected and are set forth in Table V.

In the formulations prepared according to the present invention, the paint solids did not separate from the oil phase in all cases. Therefore, a mass balance of the sum of the organic and solid phases was determined. This is also presented in Table V. The mass balance of the formulations are generally greater than the mass balance of the conventional formulations.

From the foregoing, it can be concluded that treatment compositions prepared according to the present invention provide enhanced paint solids containment at lower total organic concentrations with better recovery than conventional overspray treatment compositions.

TABLE III

| TEST OVERSPRAY TREATMENT COMPOSITIONS VOLUME OF RAW MATERIALS (ml) | | | | | | |
|---|---|---|---|---|---|---|
| RAW MATERIALS | 1 | 2 | 3 | 4 | 5 | 6 |
| 100 SECOND OIL | 55.8 | 44.6 | 44.6 | 18.6 | | |
| OLEIC ACID | 4.2 | 3.4 | 3.4 | 3.4 | 6.0 | 6.0 |
| DBE | | 12.0 | | 24.0 | | |
| DIB | | | 12.0 | | | |
| 224 MONO | | | | | 30.0 | 30.0 |
| NONOXYNOL-4 | | | | | | 6.0 |
| WATER | 140.0 | 140.0 | 140.0 | 154.0 | 164.0 | 158.0 |
| TOTAL | 200.0 | 200.0 | 200.0 | 200.0 | 200.0 | 200.0 |
| PERCENT VOLUME OF RAW MATERIALS | | | | | | |
| 100 SECOND OIL | 28 | 22 | 22 | 9 | 0 | 0 |
| OLEIC ACID | 2 | 2 | 2 | 2 | 3 | 3 |
| DBE | 0 | 6 | 0 | 12 | 0 | 0 |
| DIB | 0 | 0 | 6 | 0 | 0 | 0 |
| 224 MONO | 0 | 0 | 0 | 0 | 15 | 15 |
| NONOXYNOL-4 | | | | | | 3 |
| WATER | 70 | 70 | 70 | 77 | 82 | 79 |
| OIL PHASE | 30 | 30 | 30 | 23 | 18 | 21 |

TABLE III-continued

| TEST OVERSPRAY TREATMENT COMPOSITIONS PERCENT VOLUME OF RAW MATERIALS (%) | | | | | | |
|---|---|---|---|---|---|---|
| RAW MATERIALS | 1 | 2 | 3 | 4 | 5 | 6 |
| PH | 8.48 | 8.60 | 8.90 | 8.70 | 8.75 | 8.80 |

TABLE IV

| | STABILITY OF TEST EMULSIONS (EXAMPLES 1-6) | | | | | |
|---|---|---|---|---|---|---|
| FORMULA NUMBER | INITIAL EMULSION ORGANIC CONC.(%) | PAINT ADDED TO EMULSION CONC.(%) | EMULSION AFTER SEVEN DAYS (%) ORGANIC | (%) WATER | (%) SOLIDS | ORGANIC MASS BALANCE |
| 1 | 27 | 0 | 28 | 72 | 0 | 103 |
| 2 | 27 | 0 | 24 | 76 | 0 | 90 |
| 3 | 27 | 0 | 29 | 71 | 0 | 105 |
| 4 | 21 | 0 | 8 | 92 | 0 | 39 |
| 5 | 15 | 0 | 15 | 85 | 0 | 100 |
| 6 | 19 | 0 | 21 | 17 | 0 | 109 |

TABLE V

| | EFFECTIVENESS OF TEST FORMULATIONS IN DISPERSING VARIOUS PAINT SOLIDS THEREIN | | | | | |
|---|---|---|---|---|---|---|
| FORMULA NUMBER | INITIAL EMULSION ORGANIC CONC.(%) | PAINT ADDED TO EMULSION CONC.(%) | EMULSION AFTER SEVEN DAYS (%) ORGANIC | (%) WATER | (%) SOLIDS | ORGANIC & SOLIDS MASS BALANCE |
| MFGR "A CLEAR COAT (EXAMPLES 7-12) | | | | | | |
| 1 | 27 | 14 | 27 | 69 | 4 | 76 |
| 2 | 27 | 14 | 21 | 75 | 4 | 61 |
| 3 | 27 | 14 | 26 | 70 | 4 | 73 |
| 4 | 21 | 14 | 8 | 77 | 15 | 66 |
| 5 | 15 | 14 | 0 | 83 | 17 | 58 |
| 6 | 19 | 14 | 0 | 73 | 27 | 82 |
| MFGR "A" BASE COAT (EXAMPLES 13-18) | | | | | | |
| 1 | 27 | 14 | 29 | 69 | 2 | 74 |
| 2 | 27 | 14 | 13 | 88 | 0 | 30 |
| 3 | 27 | 14 | 25 | 73 | 2 | 66 |
| 4 | 21 | 14 | 4 | 92 | 4 | 23 |
| 5 | 15 | 14 | 0 | 82 | 18 | 64 |
| 6 | 19 | 14 | 0 | 73 | 27 | 82 |
| MFGR "A" PRIME COAT (EXAMPLES 19-24) | | | | | | |
| 1 | 27 | 14 | 29 | 71 | 0 | 71 |
| 2 | 27 | 14 | 4 | 96 | 0 | 10 |
| 3 | 27 | 14 | 17 | 83 | 0 | 40 |
| 4 | 21 | 14 | 8 | 85 | 6 | 42 |
| 5 | 15 | 14 | 0 | 76 | 24 | 82 |
| 6 | 19 | 14 | 0 | 73 | 27 | 82 |
| MFGR "B" BASE COAT (EXAMPLES 25-30) | | | | | | |
| 1 | 27 | 14 | 27 | 71 | 2 | 71 |
| 2 | 27 | 14 | 6 | 90 | 4 | 24 |
| 3 | 27 | 14 | 24 | 69 | 6 | 74 |
| 4 | 21 | 14 | 7 | 80 | 13 | 56 |
| 5 | 15 | 14 | 23 | 71 | 6 | 102 |
| 6 | 19 | 14 | 25 | 71 | 4 | 88 |

Having thus described the composition of the present invention, what is claimed is:

1. A composition for treating oversprayed paints consisting essentially of:
   between about 5 and about 50 percent by volume of a carbonyl compound selected from the group consisting of
   a. alcohol esters having the general formula:

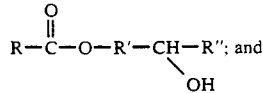

b. condensation products of alcohol esters and carboxylic acids having the general formula:

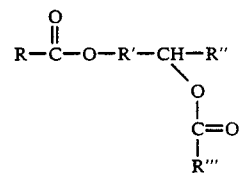

and mixtures thereof, wherein R' and R" is chosen from the group consisting of substituted alkyl groups, unsubstituted alkyl groups and mixtures thereof, said substituted and unsubstituted alkyl groups having from 1 to 8 carbon atoms, wherein R and R''' are chosen from the group consisting of linear alkyl groups having from 1 to 10 carbon atoms, branched alkyl groups having from 1 to 10 carbon atoms, R and R''' being either identical or different alkyl functionalities, said carbonyl compound being capable of dissolving paint while remaining essentially insoluble in and non-reactive with an aqueous media;

between about 0.1 about 10% by volume of a surfactant selected from the group consisting of ethoxylated alkyl phenols having an average ratio of moles of ethylene oxide to moles of alkyl phenol between about 4:1 and about 8:1;

between about 0.1 and about 20% by volume of an emulsifier; and water.

2. The composition of claim 1, wherein said ethoxylated alkyl phenol surfactant is selected from the group consisting of nonoxynol-4, nonoxynol-6, nonoxynol-8, and mixtures thereof.

3. The composition of claim 1, wherein said emulsifier has an HLB value ranging from about 6 to about 40.

4. The composition of claim 1, wherein said carbonyl compound is selected from the group consisting of secondary propanol esters, secondary butanol esters, secondary pentanol esters, condensation products of a reaction between secondary propanol esters and carboxylic acid condensation products of a reaction between secondary butanol esters and carboxylic acid, condensation products of a reaction between secondary pentanol esters and carboxylic acid, and mixtures thereof.

5. The composition of claim 1, wherein said carbonyl compound is selected from the group consisting of 2,2,4-trimethyl-1,3-pentanediol monoisobutyrate, 2,2,4-trimethyl-1,3-pentanediol diisobutyrate, and mixtures thereof present in an amount from about 5% to about 30% by volume.

6. The composition of claim 1, wherein said emulsifier is selected from the group consisting of carboxylic acids having from 12 to 30 carbons, alkali metal salts of said carboxylic acids, quaternary amine salts of said carboxylic acids, and mixtures thereof.

7. The composition of claim 6 wherein said emulsifier is present in an amount between about 0.1 and about 10% by total composition volume and said surfactant is present in an amount between about 0.5 and about 2.0% by total composition volume.

8. The composition of claim 1, wherein said ethoxylated alkyl phenol surfactant is selected from the group consisting of nonoxynol-4, nonoxynol-6, nonoxynol-8, and mixtures thereof.

9. The composition of claim 8 wherein said emulsifier has an HLB value ranging from about 6 and about 40 and is selected from the group consisting of carboxylic acids having from about 12 to 30 carbon atoms, alkali metal salts of said carboxylic acid, quaternary amine salts of said carboxylic acids and mixtures thereof.

10. The composition of claim 9 wherein said carbonyl compound is present in an amount between about 5% and about 30% by total composition volume.

11. The composition of claim 10 wherein said surfactant is selected from the group consisting of nonyl-phenoxypolyoxyethylene ethanols having an average ethylene oxide-to-nonyl phenol ratio of about 4:1 and wherein said carbonyl compound is selected from the group consisting of 2,2,4-trimethyl-1,3-pentanediol monoisobutyrate, 2,2,4-trimethyl-1,3-pentanediol diisobutyrate, and mixtures thereof.

12. A composition for treating oversprayed paints consisting essentially of:

between about 5 and about 30% by volume of a carbonyl compound having a vapor pressure less than about 0.1 mm Hg selected from the group consisting of:

a. alcohol esters having the general formula:

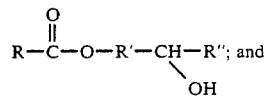

b. condensation products of alcohol esters and carboxylic acids having the general formula:

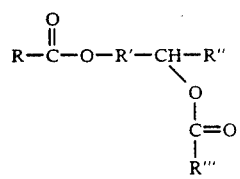

and mixtures thereof, wherein R' and R'' is chosen from the group consisting of substituted alkyl groups, unsubstituted alkyl groups and mixtures thereof, said substituted and unsubstituted alkyl groups having from 1 to 8 carbon atoms, wherein R and R''' are chosen from the group consisting of linear alkyl groups having from 1 to 10 carbon atoms, branched alkyl groups having from 1 to 10 carbon atoms, R and R''' being either identical or different alkyl functionalities, said carbonyl compound being capable of dissolving paint while remaining essentially insoluble in and non-reactive with an aqueous media, said carbonyl compound being capable of dissolving paint and being essentially insoluble and non-reactive with an aqueous media;

between about 0.1 and about 10% by volume of a nonionic, ethoxylated alkyl phenol surfactant, said surfactant being essentially insoluble in and non-reactive with water;

between about 0.1 and about 20% by volume of an emulsifier having an HLB value between about 6 and about 40; and water.

13. The composition of claim 12 wherein said emulsifier is present in an amount between about 0.1 and about 10% by volume, said emulsifier being a carboxylic acid having between about 16 and about 24 atoms.

14. The composition of claim 13 wherein said surfactant is present in an amount between about 0.5 and about 2.0% by total composition volume.

15. The composition of claim 14 wherein said surfactant is an ethoxylated nonyl phenol having an average ethylene oxide-to-nonyl phenol ratio between 4:1 and 8:1.

16. The composition of claim 14 wherein said carbonyl compound is selected from the group consisting of 2,2,4-trimethyl-1,3-pentanediol monoisobutyrate, 2,2,4-trimethyl-1,3-pentanediol diisobutyrate, and mixtures thereof.

17. The composition of claim 16 wherein said emulsifier is a carboxylic acid selected from the group consisting of oleic acid, alkali metal salts of oleic acid, quaternary amine salts of oleic acid, and mixtures thereof.

18. A composition for treating oversprayed paints consisting essentially of:
between about 12% and about 18% by volume of a carbonyl compound selected from the group consisting of 2,2,4-trimethyl-1,3-pentanediol monoisobutyrate, 2,2,4-trimethyl-1,3-pentanediol diisobutyrate, and mixtures thereof;
between about 0.5% and about 2.0% by volume of a surfactant, said surfactant being selected from the group consisting of nonylphenoxypolyoxyethylene ethanols having an average ethylene oxide-to-nonyl phenol mole ratio of about 4:1;
between about 0.1 and about 10.0% by volume of an emulsifier having an HLB value between about 10 and about 30; and
water, wherein said carbonyl compound, surfactant and emulsifier when combined constitute less than about 25% by volume of said composition.

* * * * *